United States Patent [19]

Gallaher, Sr.

[11] 4,309,285
[45] Jan. 5, 1982

[54] APPARATUS FOR REMOVING CONTAMINANTS FROM WATER

[75] Inventor: Patrick J. Gallaher, Sr., Toledo, Ohio

[73] Assignee: Pat-Air, Inc., Waterville, Ohio

[21] Appl. No.: 69,971

[22] Filed: Aug. 27, 1979

[51] Int. Cl.³ .............................................. C02B 1/34
[52] U.S. Cl. .................... 210/123; 210/219; 210/221.2
[58] Field of Search ............... 210/128, 219–221 P, 210/916, 121, 123, 103, 104; 261/111, 115, 87–88

[56] References Cited

U.S. PATENT DOCUMENTS

| | | | |
|---|---|---|---|
| 2,591,134 | 4/1952 | Canariis | 210/916 |
| 2,811,258 | 10/1957 | Schleyer et al. | 210/218 |
| 3,796,417 | 3/1974 | Kaelin | 210/219 |
| 4,008,153 | 2/1977 | Mackrle et al. | 210/219 |
| 4,066,722 | 1/1978 | Pietruszewski | 210/219 |

*Primary Examiner*—John Adee
*Attorney, Agent, or Firm*—Wilson, Fraser, Barker & Clemens

[57] ABSTRACT

An apparatus for treating water in which water is delivered under pressure to a closed tank in the form of a spray or fog. An aerator in the bottom of the tank draws atmospheric air from outside of the tank and creates laterally directed air jets for violently stirring up and oxidizing the water. Gases are exhausted from the tank at the top. A series of baffles surround the aerator against which the jets impinge and provide for hydraulic streams. Float valves control the amount of water maintained within the tank. Treated water is drawn from the tank through a pipe extending to the lower portion.

2 Claims, 4 Drawing Figures

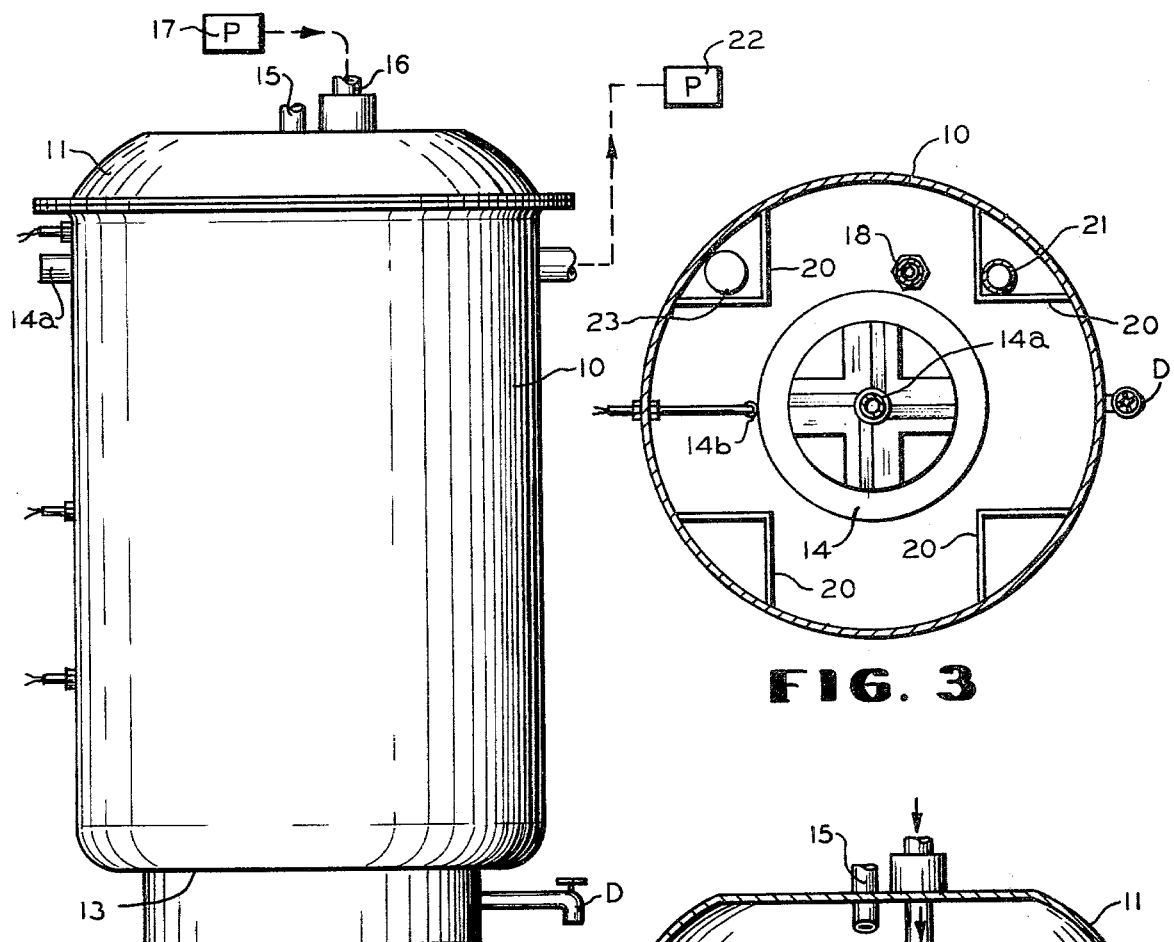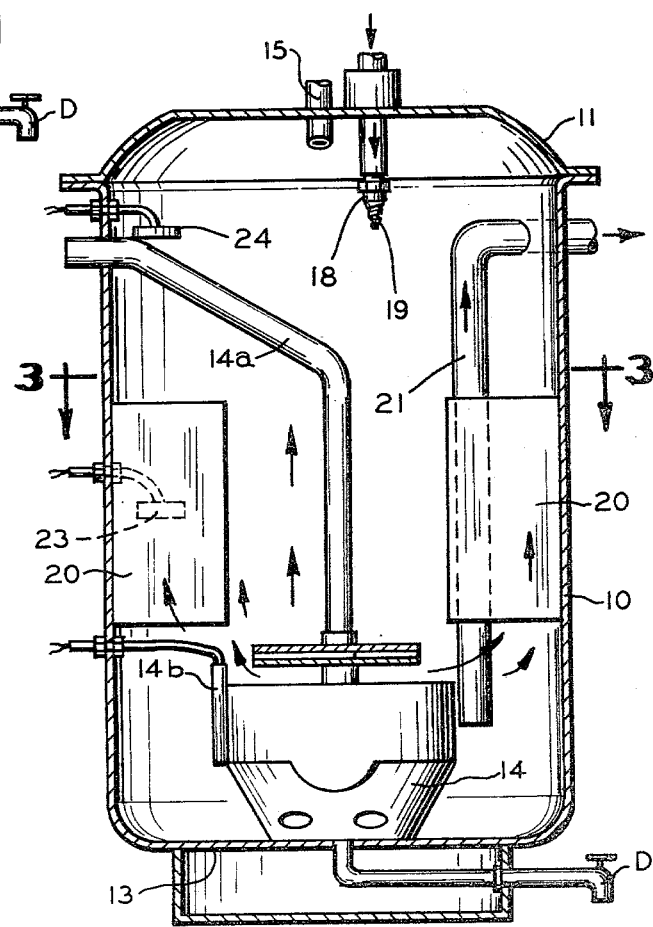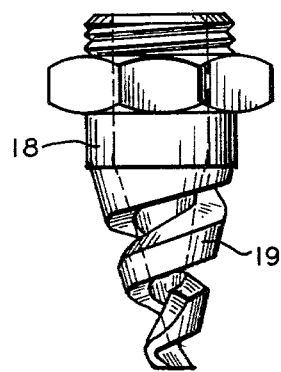

APPARATUS FOR REMOVING CONTAMINANTS FROM WATER

BACKGROUND OF THE INVENTION

The treatment of raw water having obnoxious odors and disagreeable colour has been carried on in many ways. In a measure, these procedures have succeeded in producing potable water free of the dark colour. However, the cost has been so high as to be beyond the average household capability. Then too, some of the procedures employ apparatus requiring maintenance calling for expertise and more expense.

One particularly troublesome chemical present in much water is hydrogen sulphide, which makes raw water so dark in colour as to be called "black water", because indeed the colour is almost black. Also, in the dissolved impurities in the water are objectionable amounts of iron compounds and soluable compounds of other metals, such as manganese and strontium. To make "black water" potable and capable of household use, the hydrogen sulfphide must be removed and desirably so must many of the soluable compounds.

Examples of water treatment pertinent in this case are disclosed in U.S. patents to Victor Schleyer et al, U.S. Pat. No. 2,811,258 and J. Robert Krebs et al, U.S. Pat. No. 3,923,656, and J. F. Sebold, U.S. Pat. No. 2,379,753.

SUMMARY OF THE INVENTION

Raw water is introduced into a closed tank in a comminuted or spray form causing the water particles to be violently thrown laterally. This takes place in the upper portion of the tank and causes the water particles to come into contact with the oxygen in the air. In the lower portion of the tank is an aerator, which draws in atmospheric air and causes it to be forcefully expelled jet wise laterally into the water fallen from the nozzle to the lower portion of the tank. This causes the oxygen in the air to be intimately mixed with the water. As a result, the hydrogen sulphide in the water on being contracted by oxygen in air causes the sulphur to become sulphur dioxide, a gas, which escapes through a vent in the tank. The operation is assisted by an annular array of V-shaped baffles against which water is forcefully thrown and which provide vertical channels for the hydraulic currents. Iron and other solids are withdrawn by a drain from the bottom of the tank. The water level is maintained within the tank by float switches which control the operation of the water feed pump.

BRIEF DESCRIPTION OF THE DRAWINGS

FIG. 1 is a side elevation of a water treatment apparatus in accordance with the present invention;

FIG. 2 is a vertical sectional elevation of the apparatus shown in FIG. 1;

FIG. 3 is a transverse sectional view of the line 3—3 of FIG. 2; and

FIG. 4 is an enlarged elevation of the water discharge nozzle.

DESCRIPTION OF THE PREFERRED EMBODIMENT

In the apparatus shown, an upright cylindrical treatment tank 10, which may be molded from glass fibers so that it is of light weight, has an open top provided with an out-turned flange fitted with a suitable gasket to receive a dome-shaped cover 11, suitable bolt assemblies securing these parts liquid tight. The bottom end 13 of the tank is closed and has a supporting foot base. A valve controlled drain D leads from the bottom of the tank and extends through the supporting base.

Supported in the bottom of the tank 10 below the water level is an aerator 14 connected to an air intake pipe 14a which extends to the outside through a side wall of the tank. The pipe 14a, as well as other pipes used in the apparatus, may be formed of plastic, such as polyethylene, for example. Any suitable aerator may be used, such as the Submersible Aerator manufactured by Multi-Flo, Inc. of Dayton, Ohio. The aerator is connected to a power line 14b which delivers electric current through the side wall of the tank. Air drawn into the tank by the aerator by means of a rotating disc equipped with radially dispersed channels is discharged outwardly and upwardly, as indicated by the arrows on FIG. 2. Some air and gas escape from the tank to the outside through an exhaust pipe 15 in the top or cover 11 but other air from the aerator returns in a downward flow pattern so that air expelled by the aerator sets up hydraulic currents and intimately contacts the water for oxidizing the water in the tank with oxygen from the air. Thus, purification of the water by its contact with oxygen takes place in the violent streams of air mixing with and impinging on the water.

Water is introduced to the tank 10 through a generally central intake pipe 16 under pressure by a pump 17, the pipe 16 extending vertically downward and terminating about one fourth of the depth of the tank. On the end of pipe 16 is a nozzle 18 for creating a mist or fog, thereby breaking up the stream of water into infinitely small droplets. Any suitable nozzle may be used, such as the Bete Fog Nozzle #TF24FON manufactured at Greenfield, Mass., which is of TEFLON and has no moving parts. The stream of water is gradually constricted and baffled by a tapered helix 19. The water is thus delivered to the inside of the tank comminuted form, thereby subjecting it to contact by the oxygen in the air before collecting in the lower part of water treatment chamber of the tank and where it is violently agitated by the air streams generated by the aerator 14.

A circular row of similar V-shaped baffles 20, four in number and equidistantly spaced from each other, are disposed in the lower portion of the tank in the region directly above the aerator 14 and terminating below the fog nozzle. The baffles 20 are in the form of flat angular plates with the apex of each V toward the center and the outer side edges being suitably secured to the inner walls of the tank. The baffles 20 aid in breaking up the streams of water and in intimately mixing the oxygen of the air with the water particles. Not only do the baffles provide surfaces against which the air impells water particles but also form vertical channels for assisting in water movement and turbulence.

Treated water is withdrawn from the tank by a pipe 21 which is vertically disposed and has its lower end near the bottom wall 13 of the tank. The upper end extends through the side wall of the tank 10, and a pump 22 is powered to draw water through the discharge pipe 21.

Inasmuch as the water treatment apparatus is largely used by householders, it is automatic in its control of the water level within the tank. For this purpose, water level actuated float switches 23 and 24 are suitably disposed provided the water level in the tank is below a predetermined point, the switch 23 will energize the motor controlling pump 17 to deliver water through the pipe 16 and fog nozzle 18. When the water in the tank rises to a desired level, then the switch 24 operates to deenergize the motor of the pump 17 and shut off delivery of water.

In operation, raw water is delivered to the tank 10 through a relatively small pipe 16 by a pump 17. The lower end of the pipe 16, which is disposed in the upper zone of the tank, has a nozzle 18 which violently breaks up the water into minute particles in the form of a mist or fog to enable them to become intimately mixed with or contacted by the oxygen in the atmospheric air introduced to the tank interior.

Atmospheric air is drawn into the lower portion of the tank through the pipe 14a by the aerator 14 which, under the action of its spinning radial passaged disc, creates lateral air jets which cause the water to be violently agitated, impelled against the V-shaped baffles 20, and to flow in the direction of the arrows on FIG. 2. This action combined with the atomization of the water by the nozzle 18 intimately mixes the water particles with atmospheric oxygen.

Thus, raw water containing hydrogen sulphide ($H_2S$) and iron (Fe) subjected to the above action, causes oxidation of the sulphur in the water, changing it to a gas, sulphur dioxide ($SO_2$), a colorless gas. This gas presses off to the atmosphere through the exhaust pipe 15. This gas is often times referred to as "black sulphur", has a disagreeable odor and taste and is quite objectionable in potable water or water for other household uses. The iron (Fe) collects in the bottom and is drained off.

Although a preferred embodiment has been described in detail, it is to be understood that other embodiments are contemplated only with modifications of the disclosed features, as being within the scope of the invention.

What I claim is:

1. Apparatus for treating water having disagreeable odor and an objectionable color comprising:
    a. a vertically disposed closed treatment tank,
    b. a pipe for feeding raw water to an intermediate portion of the tank from the outside,
    c. a power driven pump for forcing water through said feed pipe,
    d. a nozzle on the discharge end of said pipe for comminuting the water into a mist-like fog,
    e. an aerator submerged into the water in the lower portion of the tank and having a power driven rotatable disc provided with radial channels to expel air jetwise,
    f. a pipe to deliver atmospheric air to said aerator extending from the outside of the tank,
    g. an annular row of baffles surrounding said aerator in spaced relation comprising circumferentially spaced, V-shaped plates spaced above the bottom of the tank below said nozzle and with the apices of the V's disposed towards the center of the tank and with the opposite ends juxtaposed to the tank wall, thereby providing impingement surfaces for the air and water jets, and channels for passage of hydraulic streams created within the tank,
    h. an exhaust pipe for gases in the upper portion of said tank,
    i. a pipe for treated water extending from the lower portion of the tank to the outside,
    j. a power driven pump for withdrawing water from said last pipe, and
    k. float operation switch means for controlling said pump of paragraph c to maintain a predetermined water level in the tank, below said nozzle and above the lower portion of said baffles.

2. The apparatus as claimed in claim 1 in which said circumferentially spaced V-shaped plates are equidistantly spaced around the interior of said tank.

* * * * *